(No Model.)
G. COSINE.
METHOD OF AND APPARATUS FOR RENDERING AND BLEACHING ANIMAL FATS.
No. 254,279. Patented Feb. 28, 1882.
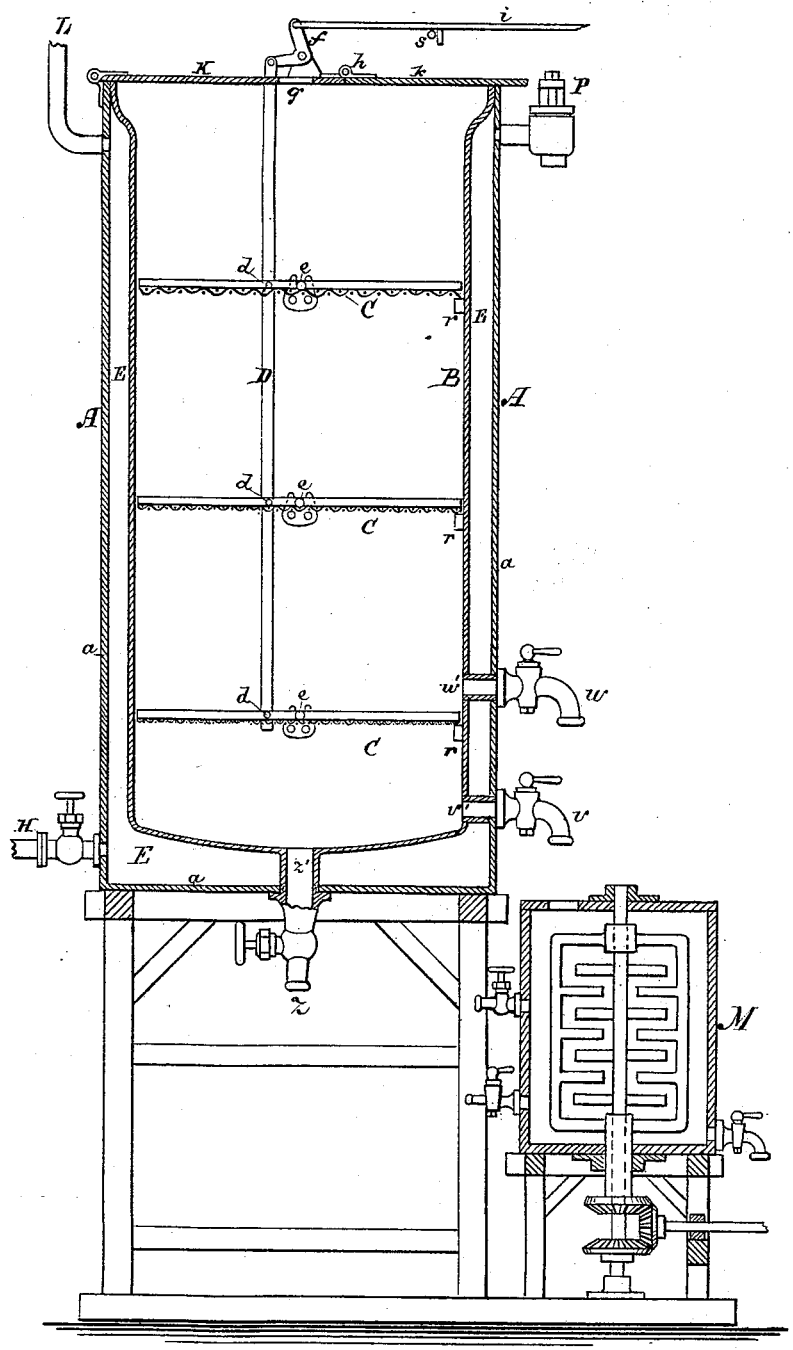
WITNESSES:
John P. Hunt Jr.
James M. Tully
Garret Cosine, INVENTOR
BY Jonathan Marshall,
ATTORNEY.

UNITED STATES PATENT OFFICE.

GARRET COSINE, OF NEW YORK, N. Y.

METHOD OF AND APPARATUS FOR RENDERING AND BLEACHING ANIMAL-FATS.

SPECIFICATION forming part of Letters Patent No. 254,279, dated February 28, 1882.

Application filed January 14, 1882. (No model.)

*To all whom it may concern:*

Be it known that I, GARRET COSINE, of the city of New York, in the county of New York and State of New York, have invented a new and Improved Process of and Apparatus for Rendering and Bleaching Animal-Fats; and I do hereby declare that the following is a full and exact description thereof.

The object of my invention is to render animal-fats by process and means whereby a pure product, free from disagreeable odors, deprived of the animal moisture originally belonging thereto, and uninjured by the heat employed in the operation, may be produced, and also to make the process more expeditious and economical than those heretofore in use.

The common method of rendering fats by batches in heated vessels scorches portions of the fat by the continuation of the same in contact with the highly-heated surfaces of the vessels, thereby deteriorating the quality of the fats, and it increases instead of removing the disagreeable odors of the same. When steam is introduced into the vessel containing the fats for rendering the same it adds considerable water thereto, instead of removing that which is natural to the fats; and when pressure under metallic plates, in connection with heat, is employed, both the scorching to some extent and the failure to remove the watery particles from the fats and the deleterious odors and impurities belonging thereto are the result. My process is intended to obviate all such objections to these methods heretofore in use.

My improved process, in general terms, consists in rendering the fats by subjecting the same, previously divided into small particles and suitably separated, to a heated atmosphere without continued contact with any metallic or other heated surface while undergoing the process.

To practically and advantageously apply the process, I cause the comminuted fats to fall into a chamber heated to a proper degree of temperature, and of sufficient depth to effect the rendering during the descent of the fats by simple contact with the air through which they pass, and while subjecting the fats to the heat in this chamber I cause a circulation of the heated air to take place through the same, for removing the odors and volatile impurities liberated from the fats during the process; and, as a part of the apparatus for carrying on the process, I insure the proper separation of the fat particles while they are descending to effectually subject them to the action of the heated air by causing them to fall through woven or perforated diaphragms, or equivalent mechanical separators, the meshes of the diaphragms, where more than one are used, diminishing in size from the upper to the lower one. This process is continuous, and very desirably so, the comminuted fats being caused to drop into the chamber without cessation, and the melted fat to flow out in a constant stream, having been subjected to the heated air only momentarily. This extremely short time in which the fats are exposed to a simple heated atmosphere causes no injury whatever to the product, however high may be the degree of temperature to which during that time they may be subjected. The essential points which distinguish this process from others are, first, that the fats are not exposed to metallic or other heated surfaces; second, that they are subjected to a rendering-atmosphere in particles finely divided and loosely separated; and, third, that the operation is so extremely short as to be almost instantaneous.

The details of the process will be clearly understood in connection with a description of the apparatus for the purpose, which I have employed, substantially as represented in the accompanying drawing, representing the same in vertical section.

The rendering part A of the apparatus comprises a suitable metallic vessel, B, for a rendering-chamber, of cylindrical or other convenient form, of a diameter or breadth proportionate to the required working capacity of the apparatus, and of suitable height to give the requisite extent of fall to the fats therein—say eight feet, more or less—and around the sides of this vessel a jacket, $a$, inclosing a steam-tight or air space, E, between it and the vessel, to receive steam or other heat-conveying medium, and one or more woven or perforated diaphragms, C C, across the interior of the vessel B, and at a suitable distance apart, when more than one are employed, a suitable number being three, as shown.

The vessel A has a lid or cover, K, which, for convenience, has or may have one part, k, hinged, as at h, to the other part to readily open to the chamber for any purpose, and this lid has one or more openings, g, through which the fat particles drop—say directly from a suitable hashing machine or machines, in which the fats are finely divided, any suitable machine for the purpose being employed. Near the bottom of the vessel B it has an outlet spout or faucet, v, at an opening, v', through which the liquid fat flows out of the vessel as fast as rendered. This faucet is best made large enough not only to draw off the melted fat, but to furnish sufficient space above the stream of fat to admit into the vessel as much air (which is preferably employed as the rendering medium) as necessary to keep up a purifying circulation within the vessel. This faucet is closed by a spigot or valve to shut off the flow at any time for any purpose. The air in the top of the vessel, more or less foul, also continually passes out through the opening or openings g in the lid or other outlet, the said opening or openings being sufficient for this purpose.

Somewhat higher than the faucet v is another opening or faucet, w, provided with a spigot or valve for a purpose auxiliary to the lower faucet, so that when, from accident or for some other purpose, the said lower faucet is closed temporarily this upper faucet may be used to admit air and to draw off the melted fat.

A drain or clearing faucet, z, is placed in the bottom of the vessel to draw off any impurities which may settle to the bottom, although if the fats are clean very little of such impurities will collect there.

As steam is the preferable means of heating the vessel B and the atmosphere therein, an induction-pipe admits superheated or ordinary steam into the jacket-space E, and an eduction-pipe carries off any condensed steam therein; also a safety-valve, P, is applied to the jacket, serving also as a means for regulating the temperature in the vessel B by the pressure of the steam.

The diaphragms C C are arranged at suitable distances apart, about two feet being a suitable distance, and the upper one has the largest meshes—say one inch across. The next below has smaller meshes—say half-inch. Another lower one has still smaller meshes—say quarter-inch. Thus the comminuted fats falling through the meshes of the upper diaphragm are much separated, and when they fall through the meshes of the second diaphragm they are still more separated. When they reach the lower diaphragm little is left except minute fibers of membraneous matter which cling to the diaphragm. The diaphragms, therefore, may gradually become fouled by the accumulation of this membraneous substance and require to be cleaned at times. They are consequently made removable from the vessel by leaving opposite pivots e e, resting in open bearings on the inner surface of the vessel B. They are also constructed to turn on the said pivots into a vertical position for the purpose of getting access to the different diaphragms, and for convenience in removing and replacing them. For this purpose the pivots e e are a little to one side of a central line across each diaphragm, so that one side is a little heavier than the other and rests securely on a rest, r, on the inside of the vessel, in a horizontal position.

A rod, D, extends down through the lid K, and is suitably connected with the said diaphragms, whereby they may be tilted into a vertical position and returned to a horizontal position.

It is desirable to further bleach the fats immediately after the rendering of the same and before they become cooled, and I connect this process directly with my improved rendering process. As the best means, therefore, I cause the melted fat as it flows from the faucet v to fall into a suitable agitator, M, and there complete the bleaching in connection with water or steam.

What I claim as my invention, and desire to secure by Letters Patent, is—

1. The process of rendering animal-fats, which consists in causing the previously-comminuted particles, thereof to pass through a heated atmosphere, the rendering being effected by the contact of the atmosphere acting upon the same in a finely-divided state, substantially as and for the purpose herein specified.

2. The process of rendering animal-fats, which consists in causing the previously-comminuted particles thereof to descend into a chamber or vessel containing a heated atmosphere to fall through one or more woven or perforated diaphragms therein, and the melted fat to immediately flow therefrom, substantially as and for the purpose herein specified.

3. The process of rendering and bleaching animal-fats, which consists in causing the previously-comminuted particles thereof to fall into a vessel or chamber, in a separated state, through a heated and continually-renewed atmosphere therein, and the melted fat to immediately flow therefrom and into a bleaching-agitator, substantially as and for the purpose herein specified.

4. An apparatus for rendering animal-fats in a finely divided and separated state by simple contact with a heated atmosphere therein, consisting essentially of a vessel, B, surrounded by a jacketed space for applying heat thereto, with one or more inlets for the fats at the top, one or more outlets for the melted fat near the bottom, and air inlets and outlets for renewing the heated atmosphere therein respectively at the bottom and top, substantially as and for the purpose herein specified.

5. In an apparatus for rendering animal-fats in a finely-divided state by simple contact with a heated atmosphere therein, two outlets, $v\,w$, for the fat, and inlets for the air, arranged one above the other, substantially as and for the purpose herein specified.

GARRET COSINE.

Witnesses:
 JOHN P. HUNT, Jr.,
 JAMES M. TULLY.